US009395999B2

(12) United States Patent
Sakugawa et al.

(10) Patent No.: US 9,395,999 B2
(45) Date of Patent: Jul. 19, 2016

(54) MICROCOMPUTER HAVING PROCESSOR CAPABLE OF CHANGING ENDIAN BASED ON ENDIAN INFORMATION IN MEMORY

(75) Inventors: Mamoru Sakugawa, Kanagawa (JP); Tomohiro Sakurai, Kanagawa (JP); Katsuyoshi Watanabe, Kanagawa (JP); Seiji Ikari, Tokyo (JP); Takashi Nasu, Kanagawa (JP); Tsutomu Kumagai, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 778 days.

(21) Appl. No.: 13/086,002

(22) Filed: Apr. 13, 2011

(65) Prior Publication Data

US 2011/0258422 A1    Oct. 20, 2011

(30) Foreign Application Priority Data

Apr. 20, 2010    (JP) .................................. 2010-097253

(51) Int. Cl.
G06F 9/44    (2006.01)

(52) U.S. Cl.
CPC ............ G06F 9/4401 (2013.01); G06F 9/4403 (2013.01)

(58) Field of Classification Search
CPC ............................. G06F 9/4403; G06F 9/4401
USPC ........................................................ 712/229
See application file for complete search history.

(56) References Cited

U.S. PATENT DOCUMENTS

| | | | |
|---|---|---|---|
| 5,524,245 A | * | 6/1996 | Zarrin et al. ...................... 713/2 |
| 5,687,337 A | | 11/1997 | Carnevale et al. |
| 2005/0251650 A1 | * | 11/2005 | Filer ...................... G06F 9/3004 712/43 |
| 2011/0191569 A1 | | 8/2011 | Ishikawa et al. |

FOREIGN PATENT DOCUMENTS

| | | |
|---|---|---|
| JP | 08-278918 | 10/1996 |
| JP | 09-097211 | 4/1997 |
| JP | 11-212945 A | 8/1999 |
| JP | 2000-235503 | 8/2000 |
| JP | 2002-251385 A | 9/2002 |
| JP | 2003-173327 A | 6/2003 |
| JP | 2005-209105 A | 8/2005 |
| WO | 2010/029794 A1 | 3/2010 |

OTHER PUBLICATIONS

Japanese Office Action issued in Application No. 2010-097253 dated Jan. 28, 2014, 6 pages.
Japanese Office Action issued in Japanese Application No. 2010-097253 dated May 13, 2014, w/English translation, 7 pages.

* cited by examiner

Primary Examiner — Andrew Caldwell
Assistant Examiner — Jyoti Mehta
(74) Attorney, Agent, or Firm — McDermott Will & Emery LLP (57) ABSTRACT

There is a need to provide a microcomputer capable of eliminating an external terminal for endian selection. Flash memory includes a user boot area for storing a program executed in user boot mode and corresponding endian information and a user area for storing a program executed in user mode and corresponding endian information. A data transfer circuit reads endian information stored in the user boot area or the user area in accordance with operation mode and supplies the endian information to a CPU before reset release of the CPU. Accordingly, an external terminal for endian selection can be eliminated.

10 Claims, 7 Drawing Sheets

MICROCOMPUTER HAVING PROCESSOR CAPABLE OF CHANGING ENDIAN BASED ON ENDIAN INFORMATION IN MEMORY

CROSS-REFERENCE TO RELATED APPLICATIONS

The disclosure of Japanese Patent Application No. 2010-097253 filed on Apr. 20, 2010 including the specification, drawings and abstract is incorporated herein by reference in its entirety.

BACKGROUND

The present invention relates to a microcomputer including a CPU (Central Processing Unit) and peripheral circuits. More particularly, the invention relates to a microcomputer having a function of selection between big-endian and little-endian.

In recent years, microcomputers are used for various purposes and provide diversified functions. Such microcomputer functions include a function of selecting the endian, i.e., representation of byte data as operation mode for the CPU.

Previously, the endianness for microcomputer data had been fixed to little-endian or big-endian. An external terminal had been used to select either endian on a microcomputer that is operable on both endian types. A user needed to preset the external terminal for the corresponding endian. Some CPUs changed the endian mode during operations. Related techniques are described in the inventions disclosed in Japanese Unexamined Patent Publication No. Hei 9(1997)-278918, Japanese Unexamined Patent Publication No. 2000-235503, and Japanese Unexamined Patent Publication No. Hei 9(1997)-097211.

Japanese Unexamined Patent Publication No. Hei 9(1997)-278918 aims at providing a mixed-endian computer system that supports tasks having different information types for one computer system. This computer system uses a mixed-endian circuit that improves functions of an existing two-endian computer system and enables the computer system to dynamically change the endian mode. The mixed-endian computer system can change the endian mode for each task as needed. The mixed-endian circuit automatically formats data in a format expected by the running task regardless of whether the task expects data of the big-endian format or the little-endian format. The mixed-endian circuit also formats a big-endian instruction or a little-endian instruction so as to be executable on the same computer system.

Japanese Unexamined Patent Publication No. 2000-235503 aims at concurrently running multiple operating systems using different endian types on the same computer. When a process in big-endian mode interrupts the operating system running in little-endian mode, a hardware-dependent portion of the system determines that the process is targeted for big-endian. The CPU endian is changed. Control is then passed to an interrupt handler for big-endian.

The information processor described in Japanese Unexamined Patent Publication No. Hei 9(1997)-097211 aims at meeting needs for an application to process big-endian data on a microcomputer originally capable of processing only little-endian data and prevent throughput for big-endian data processing from degrading in comparison with that for little-endian data processing. The information processor includes an address space discriminator for identifying an endian type and a byte aligner for changing the data endian based on a result from the address space discriminator. Firstly, the information processor allows a system to support data and devices for two types of endian. Secondly, the information processor can fast transfer data of any type of endian regardless of data lengths. Thirdly, the information processor easily identifies the endian. Endian is permanently allocated to each address space and therefore can be fast identified only based on the address information.

Patent Document 1: Japanese Unexamined Patent Publication No. Hei 9(1997)-278918
Patent Document 2: Japanese Unexamined Patent Publication No. 2000-235503
Patent Document 3: Japanese Unexamined Patent Publication No. Hei 9(1997)-097211

SUMMARY

Though using the same type of LSI (large-scale integrated) circuits, microcomputers are manufactured as a wide range of packages using a small to large number of pins. Particularly, users demand to reserve as many available pins as possible on packages using a small number of pins. It is desirable to eliminate external terminals for endian selection and increase pins available to users.

When a microcomputer internally uses a dedicated type of endian, a user cannot change one endian type to the other even though both endian types are supported.

The present invention has been made to solve the above-mentioned problems. It is therefore an object of the invention to provide a microcomputer capable of eliminating an external terminal for endian selection.

According to an embodiment of the present invention, there is provided a microcomputer including a processor capable of changing endian. Flash memory includes a user boot area for storing a program executed in user boot mode and corresponding endian information and a user area for storing a program executed in user mode and corresponding endian information. A data transfer circuit reads endian information stored in the user boot area or the user area in accordance with operation mode and supplies the endian information to a CPU before reset release of the CPU.

The embodiment can eliminate an external terminal for endian selection because the data transfer circuit reads endian information stored in the user boot area or the user area in accordance with operation mode and supplies the endian information to the CPU before reset release of the CPU.

DETAILED DESCRIPTION

First Embodiment

Figure 1:
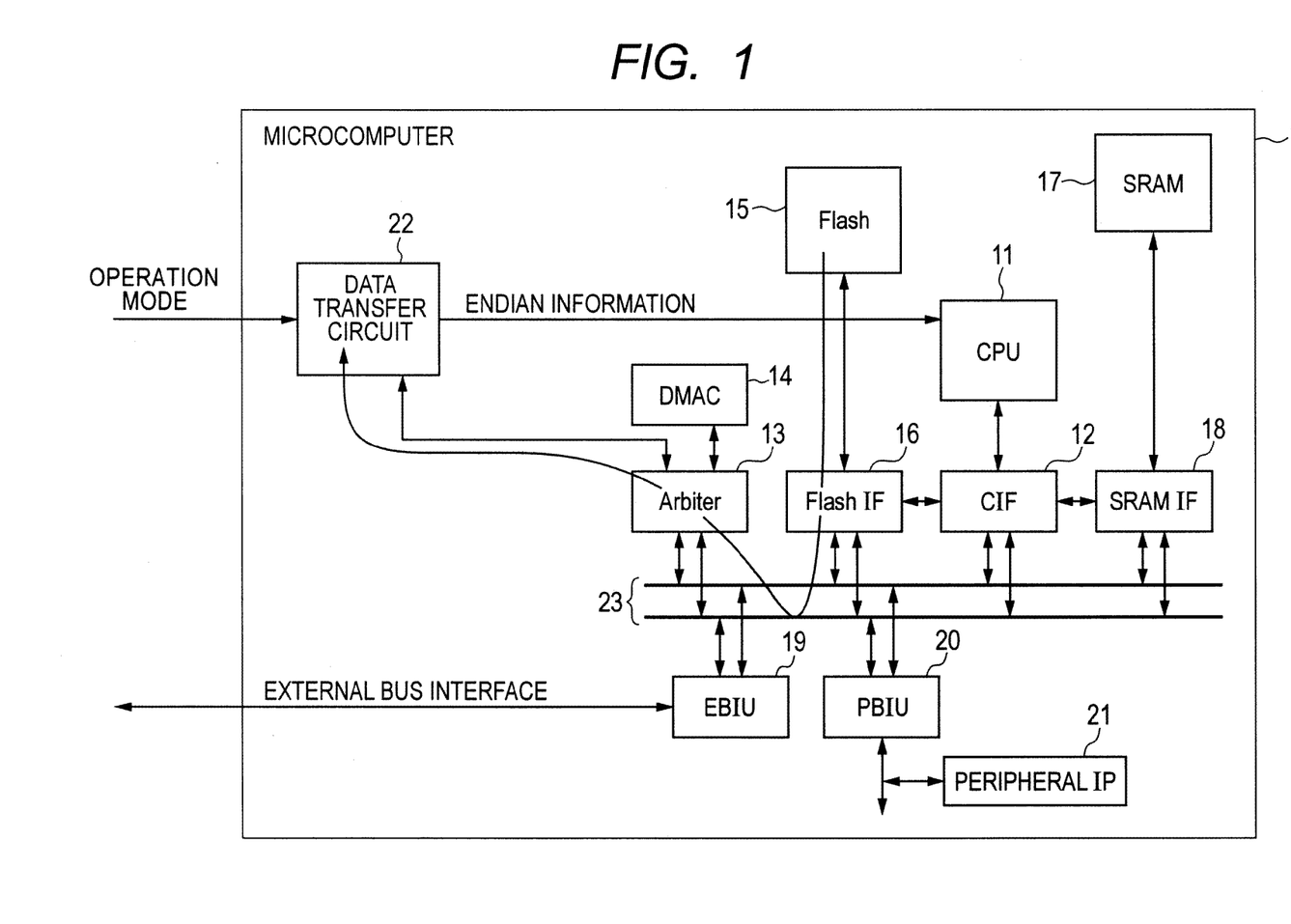
FIG. 1 is a block diagram showing a configuration example of a microcomputer according to a first embodiment of the invention.

FIG. 1 is a block diagram showing a configuration example of a microcomputer according to a first embodiment of the invention. A microcomputer 1 includes a CPU 11, a CIF (CPU Interface) 12, a bus arbiter 13, a DMAC (Direct Memory Access Controller) 14, flash memory 15, a flash IF (interface) 16, SRAM (Static Random Access Memory) 17, SRAM IF 18, an EBIU (External Bus Interface Unit) 19, a PBIU (Peripheral Bus Interface Unit) 20, a peripheral IP (Intellectual Property) 21, and a data transfer circuit 22.

The CPU 11 is coupled to an internal bus 23 through the CIF 12 and can access the flash memory 15, the SRAM 17, the peripheral IP 21, and an external device coupled to an external bus. The CPU 11 includes both big-endian and little-endian and changes the endian mode depending on an endian signal output from the data transfer circuit 22.

The bus arbiter 13 monitors and arbitrates accesses for the CPU 11 and the DMAC 14.

The DMAC 14 controls DMA transfer between memory devices or between the memory and an IO (Input/Output) device based on information such as transfer origin/destination addresses and data transfer counts written to an internal register.

The flash memory 15 is coupled to the internal bus 23 through the flash IF 16 and inputs or outputs data in accordance with an access from the CPU 11, the DMAC 14, and the data transfer circuit 22.

The SRAM 17 is coupled to the internal bus 23 through the SRAM IF 18 and inputs or outputs data in accordance with an access from the CPU 11 and the DMAC 14.

The EBIU 19 is coupled between the internal bus 23 and the external bus. The EBIU 19 accesses an external device coupled outside the microcomputer 1 in accordance with an access from the CPU 11.

The peripheral IP 21 includes peripheral circuits such as an SIO (Serial Input/Output) device, a timer, and a sensor. The peripheral IP 21 is coupled to the internal bus 23 through a PBIU 20 and inputs or outputs data in accordance with accesses from the CPU 11.

Figure 2A:
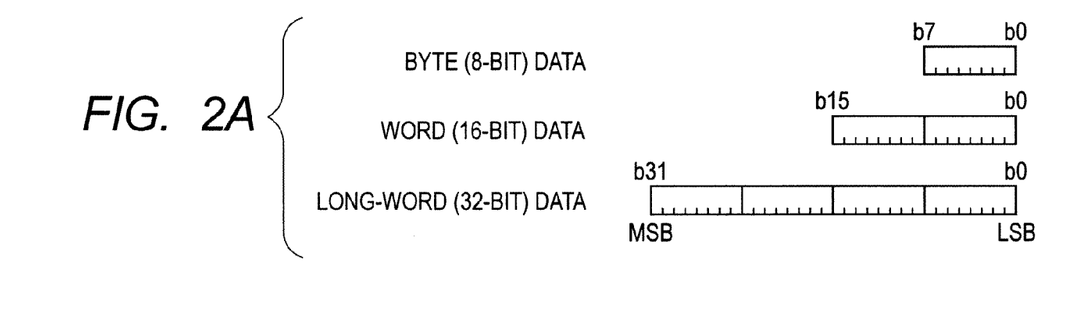
FIGS. 2A and 2B show data allocation in a register and memory for a CPU 11 according to the first embodiment of the invention.

The internal configuration and operations of the data transfer circuit 22 will be described in detail. FIGS. 2A and 2B show data allocation in a register and memory for a CPU 11 according to the first embodiment of the invention. FIG. 2A shows data allocation in a register. For example, a long-word (32-bit) register contains the LSB (Least Significant Bit) at bit 0 (b0) and the MSB (Most Significant Bit) at bit 31 (b31).

Figure 2B:
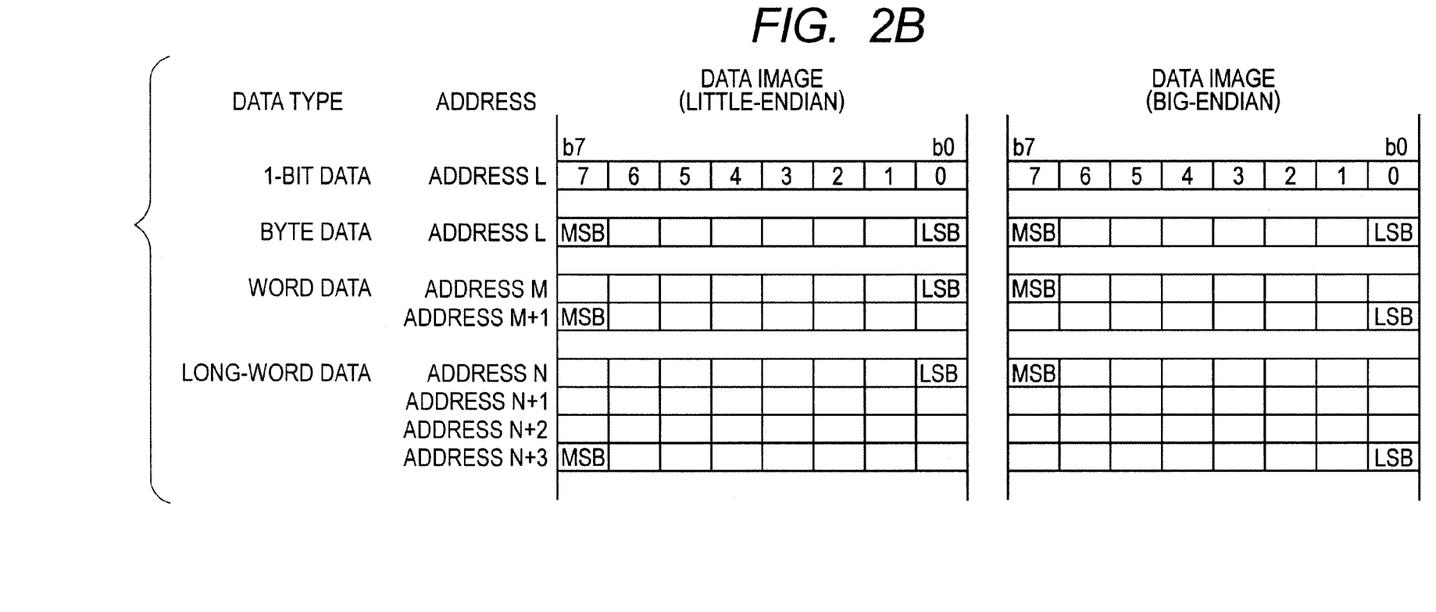

FIG. 2B shows data allocation in the memory. According to little-endian, for example, long-word data contains the LSB at address N, bit 0 (b0) and the MSB at address N+3, bit 7 (b7). According to big-endian, for example, long-word data contains the LSB at address N+3, bit 0 (b0) and the MSB at address N, bit 7 (b7).

Figure 3:
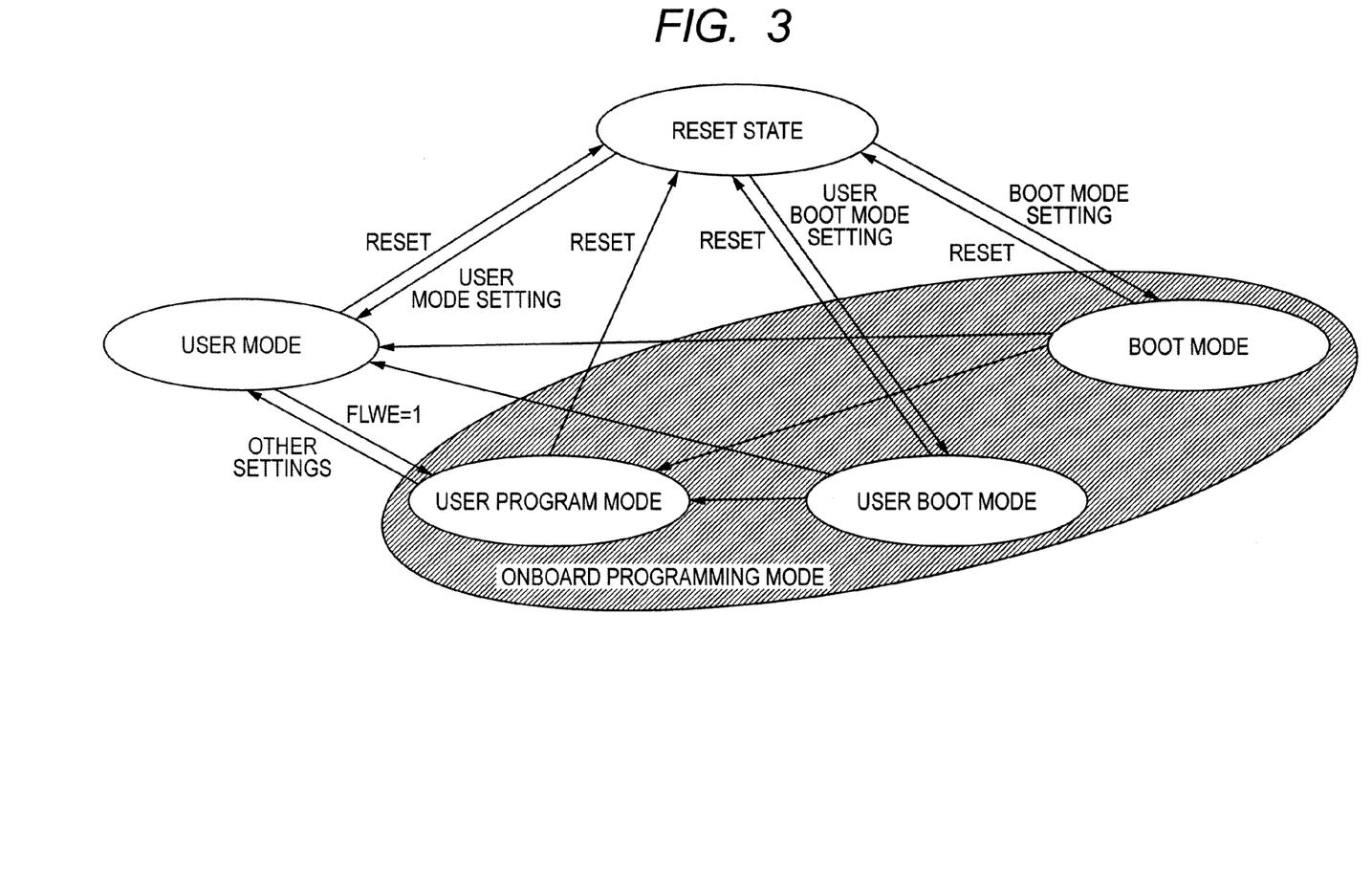
FIG. 3 illustrates operation mode transition for the CPU 11 according to the first embodiment of the invention.

FIG. 3 illustrates operation mode transition for the CPU 11 according to the first embodiment of the invention. As shown in FIG. 1, an external terminal (MD terminal) of the microcomputer 1 can be used to switch between operation modes, i.e, boot mode, user boot mode, and single chip mode.

When the external terminal enables the boot mode, the current mode changes to the boot mode after reset release. The boot mode executes a program located in a boot area of the flash memory. A user cannot delete or rewrite the program located in the boot area.

When the external terminal enables the user boot mode, current mode changes to the user boot mode after reset release. The user boot mode executes a small-scale boot program placed in a user boot area of the flash memory so that a user program can be rewritten later.

The relatively small-scale boot program in the user boot mode has a function equivalent to BIOS (Basic Input Output System) for personal computers (PCs). The CPU 11 cannot erase the boot program. Only a special writing device or writing program can erase or write the boot program. The user boot mode is used to allocate an unerasable program as a core of the system to the user boot area in order to update the firmware for digital consumer electronics, for example. The user boot mode allows the CPU 11 to erase or rewrite a program in the user area.

When the external terminal enables the single chip mode, the current mode changes to the single chip mode after reset release. The single chip mode executes only a user program in a user area of the flash memory. When the current mode changes to the single chip mode, a user mode is first enabled to execute the user program in the user area. As shown in FIG. 3, setting FLWE, an internal signal for the CPU 11, to 1 changes the user mode to a user program mode. The user program mode can erase or write to a program in the user area of the flash memory. The user program mode inhibits access to the user boot area to enhance the security.

The CPU 11 can execute a branch instruction to enable transition from the boot mode or the user boot mode to the user mode or the user program mode.

Figure 4A:
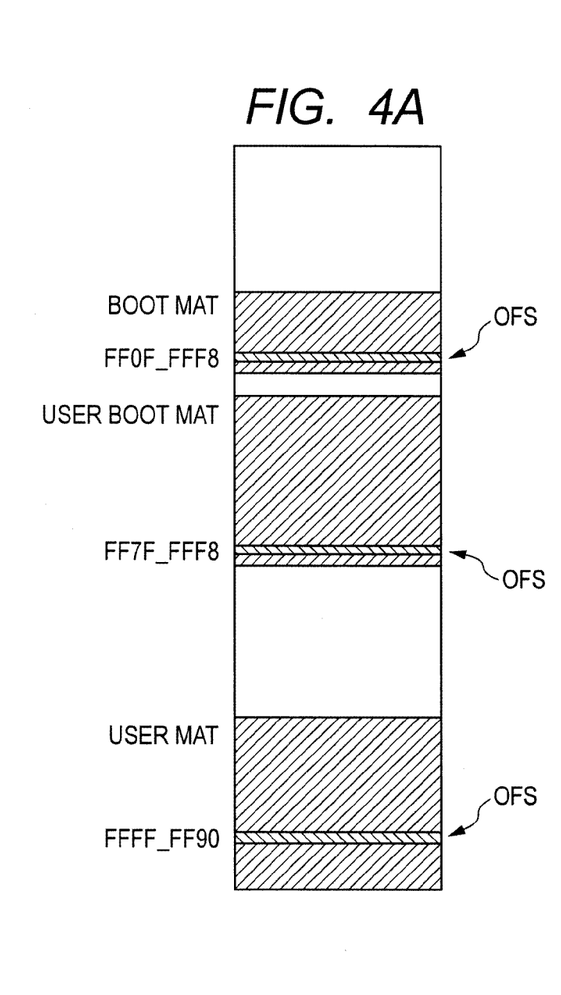
FIGS. 4A, 4B, and 4C illustrate endian selection in a microcomputer 1 according to the first embodiment of the invention.
Figure 4B:
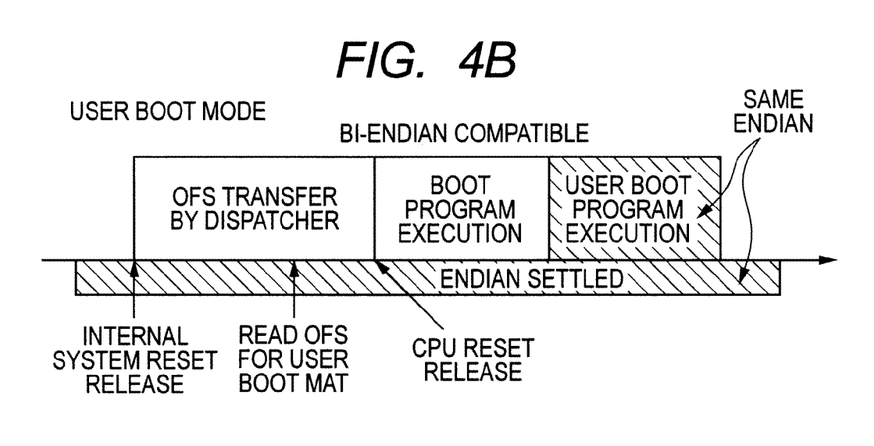
Figure 4C:
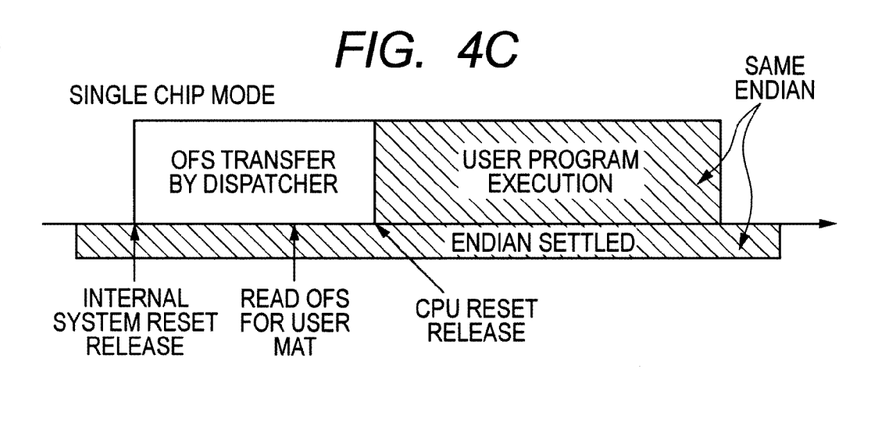

FIGS. 4A, 4B, and 4C illustrate endian selection in the microcomputer 1 according to the first embodiment of the invention. FIG. 4A exemplifies a memory map for the CPU 11. The memory map includes a boot area, a user boot area, and a user area.

An OFS (optional function selection) register is provided at address FF7F_FFF8 of the user boot area. The OFS register stores endian information in the user boot mode. The OFS register is contained in the flash memory. Accordingly, the contents of the OFS register is retained even when the microcomputer 1 is turned off or is reset. The data transfer circuit 22 reads the endian information from the OFS register and provides the CPU 11 with the endian information before the CPU 11 is reset-released and the user boot mode is enabled.

An OFS register is also provided at address FFFF_FF90 of the user area. The OFS register stores endian information in the user mode. The data transfer circuit 22 reads the endian information from the OFS register and provides the CPU 11 with the endian information before the CPU 11 is reset-released and the user mode is enabled.

An OFS register is also provided at address FF7F_FFF8 of the boot area. The OFS register stores endian information in the boot mode. The data transfer circuit 22 reads the endian information from the OFS register and provides the CPU 11 with the endian information before the CPU 11 is reset-released and the boot mode is enabled.

FIG. 4B illustrates endian information setting in the user boot mode. When the internal system reset is released, the data transfer circuit activates OFS transfer. The data transfer circuit 22 reads the endian information from the OFS register at address FF7F_FFF8 and outputs the information to the CPU 11. After the endian for the CPU 11 is settled, the reset state of the CPU 11 is released to execute the boot program. The user boot program is then executed.

FIG. 4C illustrates endian information setting in the single chip mode. When the internal system reset is released, the data transfer circuit activates OFS transfer. The data transfer circuit 22 reads the endian information from the OFS register at address FFFF_FF90 and outputs the information to the CPU 11. After the endian for the CPU 11 is settled, the reset state of the CPU 11 is released to execute a user program.

Figure 5A:
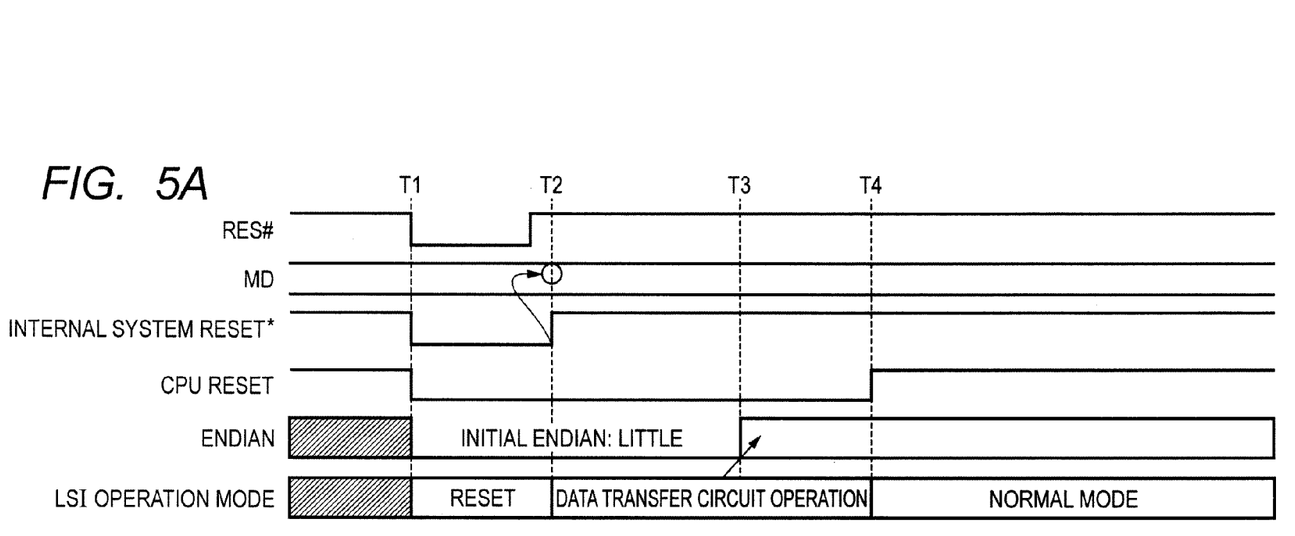
FIGS. 5A and 5B show a timing chart illustrating operations of a data transfer circuit 22 and an internal configuration of the same.
Figure 5B:
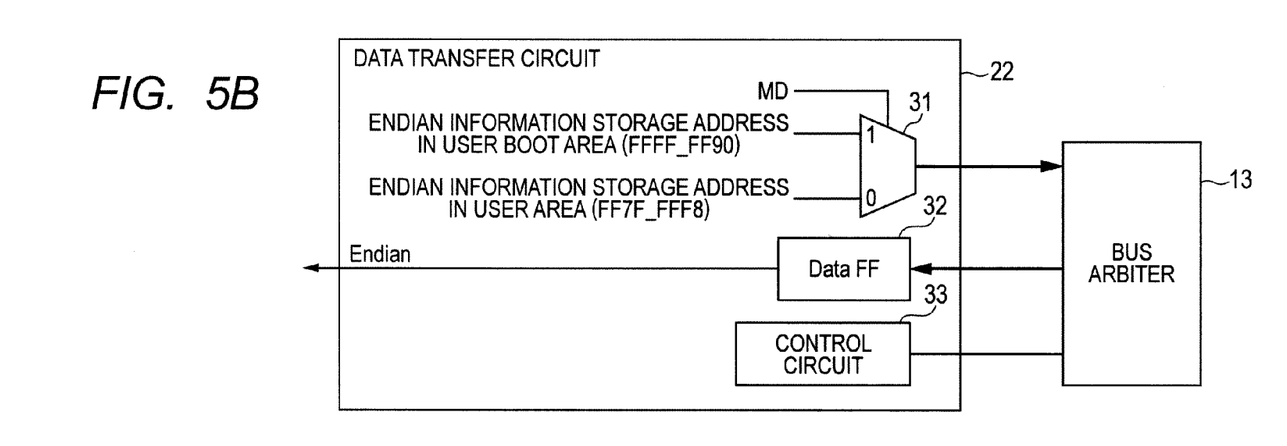

FIGS. 5A and 5B show a timing chart illustrating operations of a data transfer circuit 22 and an internal configuration of the same. When a system reset (RES#) is input at T1 in FIG. 5A, the internal reset and the CPU reset are asserted to reset the CPU 11 and its blocks. The operation mode of the microcomputer is also reset.

At T2, RES# is released and the internal reset goes high to release the reset. At this timing, the data transfer circuit 22 starts operating. It is assumed that the OFS register is initially set to little-endian.

At T3, the data transfer circuit 22 provides the CPU 11 with the endian information (little-endian). At T4, the CPU reset goes high to release the reset. The CPU 11 starts operating on the specified endian.

FIG. 5B shows an internal configuration of the data transfer circuit 22. The data transfer circuit 22 includes a selector 31, a data FF (flip-flop) circuit 32, and a control circuit 33.

The MD terminal (external terminal) supplies a value indicating the operation mode. When the MD terminal is set to "0" indicating the user boot mode, the selector 31 outputs address FF7F_FFF8 to the bus arbiter 13. This address stores OFS register for the user boot area. When the MD terminal is set to "1" indicating the single chip mode (user mode), the selector 31 outputs address FFFF_FF90 to the bus arbiter 13. This address stores OFS register for the user area.

When the internal reset is released, a control section 33 requests the bus arbiter 13 to read data from the address output from the selector 31. The bus arbiter 13 reads the contents of the OFS register from the area of the flash memory 15 corresponding to that address and outputs the read contents to the data FF circuit 32. The first embodiment does not use any area change signal.

The data FF circuit 32 retains the endian information in the OFS register received from the bus arbiter 13 and outputs the information to the CPU 11.

As mentioned above, the embodiment stores the endian information at the different addresses in the flash memory 15 corresponding to the user boot mode and the user mode. The reason is as follows.

In the user boot mode, the user boot area stores a user program. If the user area stores endian information, inadvertently erasing the user area causes the user boot program to erratically operate.

In the single chip mode, storing endian information in the user boot area is inconvenient for a user who does not use the user boot. An operation in the single chip mode cannot access the user boot area.

It is assumed that endian information is also written when the user writes a program to the flash memory 15. According to the description with reference to FIG. 5B, the selector 31 selectively outputs the address used to store the OFS register for the user boot area and the address used to store the OFS register for the user area. When the boot area also stores the OFS register as shown in FIG. 4A, the selector 31 may selectively output one of the three addresses corresponding to the MD terminal.

In the microcomputer 1 according to the embodiment, as mentioned above, the data transfer circuit 22 reads the endian information from the specified address in the flash memory 15 and supplies the endian information to the CPU 11 before the reset for the CPU 11 is released. It is possible to eliminate an external terminal for configuring the endian. Therefore, it is possible to increase an external terminal available to users.

The embodiment stores endian information in different areas of the flash memory in accordance with the operation mode. It is possible to prevent such a problem that endian information cannot be changed due to access restriction on the operation mode or endian information is inadvertently deleted.

Second Embodiment

Figure 6:
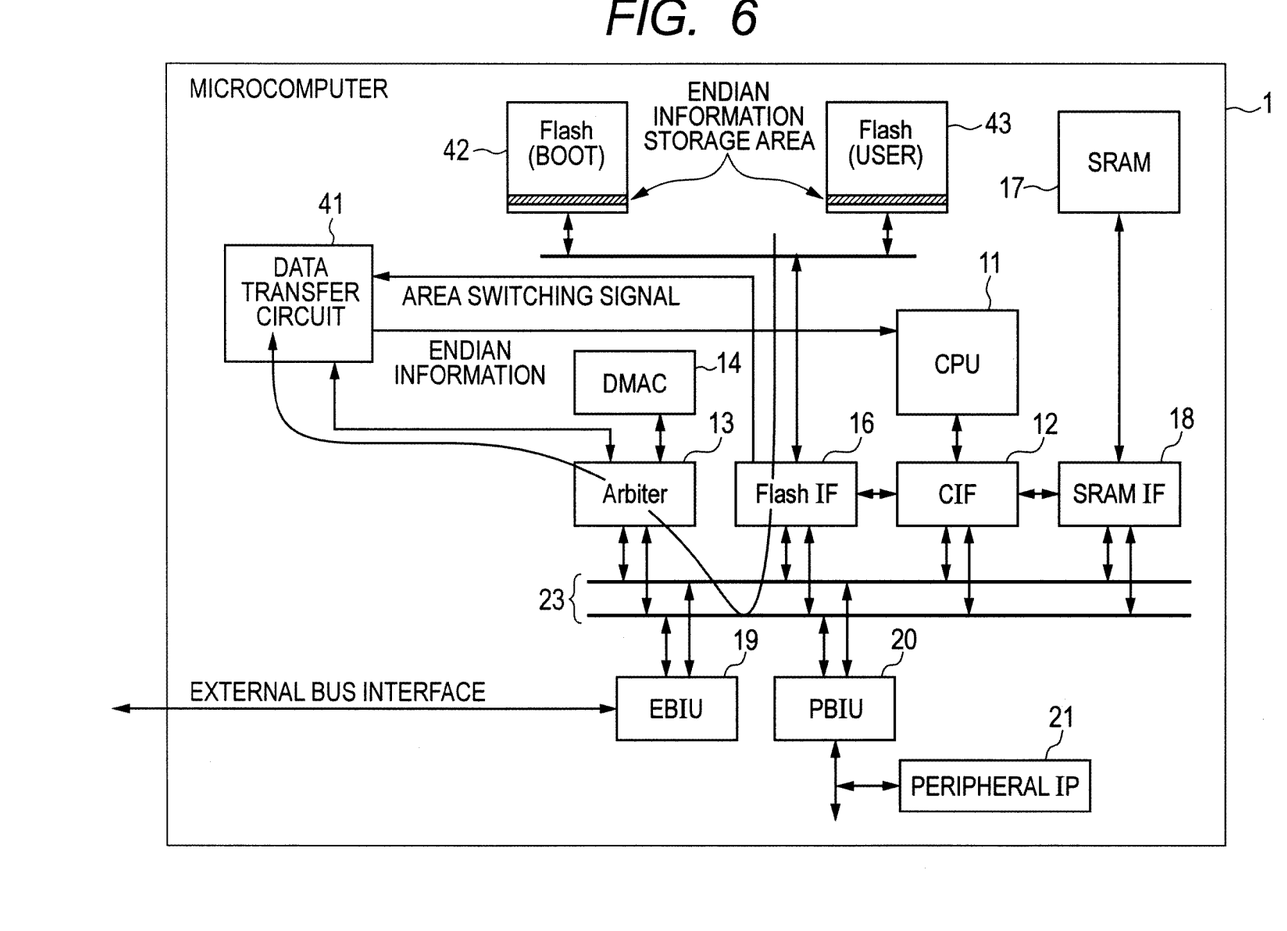
FIG. 6 is a block diagram showing a configuration example of the microcomputer 1 according to a second embodiment of the invention.

FIG. 6 is a block diagram showing a configuration example of the microcomputer 1 according to a second embodiment of the invention. The microcomputer 1 according to the second embodiment differs from that according to the first embodiment shown in FIG. 1 in two points. One is the function of the data transfer circuit 41. The other is that the flash memory is divided into flash memory 42 for the boot area and the user boot area and flash memory 43 for the user area. The description about duplicate configurations and functions is omitted for simplicity.

The flash IF 16 outputs an area change signal to the data transfer circuit 41 when an access changes from the flash memory 42 (boot area or user boot area) to the flash memory 43 (user area), or vice versa. In other words, the flash IF 16 outputs the area change signal to the data transfer circuit 41 at startup, area changeover, or stop interrupt.

The data transfer circuit 41 differs from the data transfer circuit 22 in FIG. 5A as follows. When the control circuit 33 receives an area change signal, the data transfer circuit 41 allows the selector 31 to output an address corresponding to the flash memory to which access is changed. The data transfer circuit 41 enables the bus arbiter 13 to access the OFS register (endian information storage area) in the flash memory 42 or 43. Similarly to the data transfer circuit 22, the data FF 32 receives endian information from the bus arbiter 13 and supplies the endian information to the CPU 11.

Figure 7:
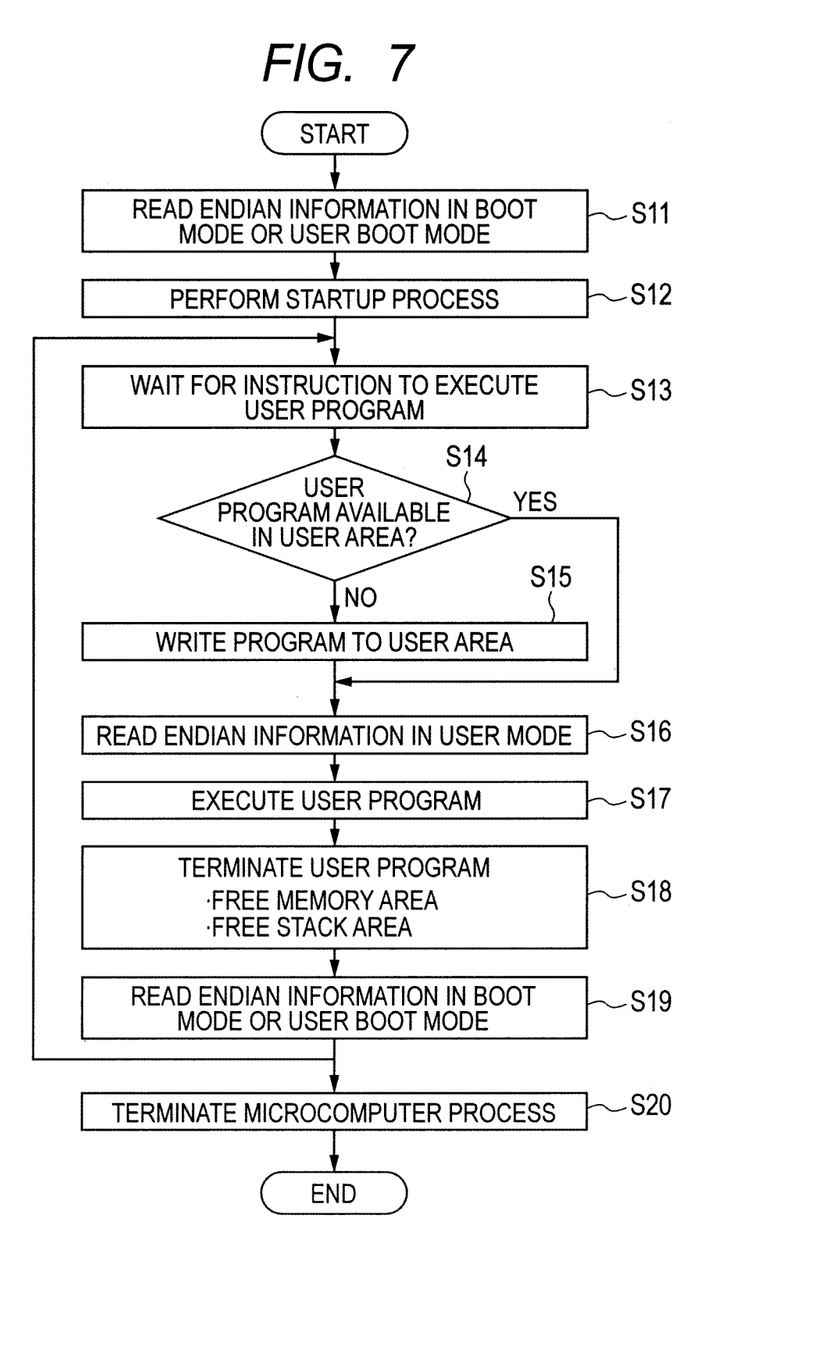
FIG. 7 is a flowchart exemplifying operations of the microcomputer 1 according to the second embodiment of the invention.

FIG. 6 is a block diagram showing a configuration example of the microcomputer 1 according to the second embodiment of the invention. When the internal reset is released, the data transfer circuit 41 reads endian information in the boot mode or the user boot mode and supplies the endian information to the CPU 11 (step S11).

When the reset for the CPU 11 is released, the CPU 11 executes a program in the boot area or the user boot area based on the specified endian to perform a startup process (step S12) for initializing the system including a power supply and a clock. The CPU 11 then waits for an instruction to execute a user program (step S13).

When receiving an instruction to execute a user program, the CPU 11 determines whether the user area contains a user program (step S14). To do this, the CPU 11 determines whether a keyword is written at the beginning of the user area, for example.

When the user area contains a user program (Yes at step S14), the process proceeds to step S16. When the user area contains no user program (No at step S14), a user program is written to the user area (step S15). The process proceeds to step S16.

At step S16, the CPU 11 executes an instruction branching to the user program in the user area. At this time, the data transfer circuit 41 detects an access change from the boot area or the user boot area to the user area, reads the endian information in the user mode, and supplies the endian information to the CPU 11.

The CPU 11 then changes the endian corresponding to the endian information output from the data transfer circuit 41 and executes the user program (step S17). The CPU 11 executes an instruction that branches from a program in the boot area or the user boot area to a program in the user area. All pipelined instructions are cleared. Even though the endian for the CPU 11 is changed, an instruction corresponding to the changed endian is newly fetched from the user area. There is no operational problem.

While executing the user program in the user area, the CPU 11 may receive an interrupt to stop the system. In this case, the CPU 11 terminates the user program, and frees the memory area and the stack area (step S18). The process then proceeds to step S19.

At step S19, the CPU 11 executes an instruction that branches to a user program in the boot area or the user boot area. The data transfer circuit 41 detects a change in the access from the user area to the boot area or the user boot area. The data transfer circuit 41 reads the endian information in the boot mode or the user boot mode and supplies the endian information to the CPU 11.

The CPU 11 executes the program in the boot area or the user boot area based on the specified endian. To execute another user program, the CPU 11 returns to step S13 and waits for an instruction to execute a program. When executing no user program, the CPU 11 terminates the process for the microcomputer 1 (step S20) and exists from the process.

The above-mentioned process relates to the case where the user area (flash memory 43) stores one piece of endian information. The user area may be divided into multiple areas each of which may store endian information. The CPU 11 may be reconfigured for the endian information each time the area to be accessed is changed.

As mentioned above, the microcomputer 1 according to the embodiment allows the data transfer circuit 41 to detect a change of access from the boot area or the user boot area to the user area, or vice versa, and supply the CPU 11 with the endian information. It is possible to change the endian based on the operation mode or the access area not only immediately after the reset release of the CPU 11 but also during operations of the CPU 11.

All the disclosed embodiments just provide examples and must be considered to be nonrestrictive. Accordingly, various modifications may be made without departing from the spirit or scope of the general inventive concept as defined by the appended claims and their equivalents.

What is claimed is:

1. A microcomputer comprising:
   a processor capable of changing endianness, the processor using an endian specified by endian information, and when an internal reset is in a first state and a processor reset is in a second state, starting resetting of the endian being used;
   a nonvolatile memory that stores the endian information; and
   a data transfer circuit that reads the endian information stored in the nonvolatile memory and supplies the processor with the endian information when the processor reset is in the second state after the internal reset changes from the first state to a third state, wherein:
   the processor starts operation on the endian specified by the endian information after the processor reset changes from the second state to a fourth state with the third state of the internal reset;
   the nonvolatile memory includes a first region for storing a first program executed when an operation mode is a first operation mode and first endian information, and a second region for storing a second program executed when the operation mode is a second operation mode and second endian information; and
   before the processor reset changes from the second state to the fourth state, the data transfer circuit
   reads the first endian information stored in the first region and supplies the first endian information to the processor when the operation mode is the first operation mode, and
   reads the second endian information stored in the second region and supplies the second endian information to the processor when the operation mode is the second operation mode.

2. The microcomputer according to claim 1, wherein the data transfer circuit includes:
   a selection circuit that selects, when the operation mode is the first operation mode, a first address for storing the first endian information, and selects, when the operation mode is the second operation mode, a second address for storing the second endian information; and
   a storage circuit that
   when the selection circuit selects the first address, stores the first endian information read from the first address and outputs the first endian information to the processor, and
   when the selection circuit selects the second address, stores the second endian information read from the second address and outputs the second endian information to the processor.

3. The microcomputer according to claim 1,
   wherein the data transfer circuit
   detects one of changes from the first region to the second region and from the second region to the first region by accessing the processor, and
   when the change from the first region to the second region is detected, reads the second endian information stored in the second region, and supplies the second endian information to the processor, when
   when the change from the second region to the first region is detected, reads the first endian information stored in the first region, and supplies the first endian information to the processor.

4. The microcomputer according to claim 3, wherein the data transfer circuit includes:
   a selection circuit that selects, when the change from the first region to the second region is detected, a second address for storing the second endian information, and selects, when the change from the second region to the first region is detected, a first address for storing the first endian information; and
   a storage circuit that
   when the selection circuit selects the first address, stores the first endian information read from the first address and outputs the first endian information to the processor, and
   when the selection circuit selects the second address, stores the second endian information read from the second address and outputs the second endian information to the processor.

5. The microcomputer according to claim 1, wherein the processor reset changes from the second state to the fourth state when operation of the data transfer circuit is finished.

6. The microcomputer according to claim 1, wherein the internal reset and the processor reset have the first state and the second state, respectively, when a system reset is input.

7. The microcomputer according to claim 6,
   wherein after the internal reset changes to the third state from the first state, the data transfer circuit outputs an address specifying a location of the nonvolatile memory, and
   the nonvolatile memory outputs the endian information stored in the location specified by the address.

8. The microcomputer according to claim 1, wherein the data transfer circuit starts operation when the internal reset changes to the third state from the first state.

9. The microcomputer according to claim 1, wherein the data transfer circuit includes a data storage circuit storing the endian information which is transferred from the nonvolatile memory and is supplied to the processor.

10. The microcomputer according to claim 9,
wherein before the data storage circuit stores the endian information, the data transfer circuit outputs an address specifying a location of the nonvolatile memory, and
the nonvolatile memory outputs the endian information stored in the location specified by the address.

* * * * *